(12) United States Patent
Tonutti

(10) Patent No.: US 6,314,710 B1
(45) Date of Patent: Nov. 13, 2001

(54) V-RAKE WITH WINDROW WIDTH ADJUSTMENT

(75) Inventor: Carletto Tonutti, Triceslmo (IT)

(73) Assignee: Tonutti S.p.A., Remanzacco (IT)

( * ) Notice: Subject to any disclaimer, the term of this patent is extended or adjusted under 35 U.S.C. 154(b) by 0 days.

(21) Appl. No.: 09/144,418

(22) Filed: Aug. 31, 1998

(51) Int. Cl.$^7$ .................................................. A01D 78/00
(52) U.S. Cl. ................................. 56/378; 56/375
(58) Field of Search ............................. 56/378, 367, 379, 56/380, 384, 385, 396, 397, 364, 377, 375, 376, 344, 345, 350, 354

(56) References Cited

U.S. PATENT DOCUMENTS

| | | | |
|---|---|---|---|
| 2,603,053 | * | 7/1952 | Lipe et al. ............................... 56/27 |
| 2,635,411 | * | 4/1953 | Hicks ..................................... 56/377 |
| 2,683,345 | * | 7/1954 | Meyer .................................... 56/377 |
| 2,727,347 | | 12/1955 | Fenster et al. . |
| 2,895,278 | | 7/1959 | Huddle et al. . |
| 3,021,904 | * | 2/1962 | Larson ................................... 171/53 |
| 3,948,028 | | 4/1976 | Reber . |
| 4,179,872 | | 12/1979 | Gerlinger . |

(List continued on next page.)

FOREIGN PATENT DOCUMENTS

| | | | |
|---|---|---|---|
| 253846 | * | 4/1967 | (AT) ....................................... 56/377 |
| 1267483 | * | 6/1961 | (FR) ....................................... 56/377 |
| 1373390 | * | 8/1964 | (FR) ....................................... 56/377 |
| 2100567 | * | 1/1983 | (GB) ....................................... 56/377 |

OTHER PUBLICATIONS

"H&S Bi–Fold Wheel Rake" Brochure, H&S Manufacturing Co., Inc. Marshfield, Wisconsin 54449, Oct. 1989.

Primary Examiner—Robert E. Pezzuto
Assistant Examiner—Nathan Mammen

(74) Attorney, Agent, or Firm—Boyle, Fredrickson, Newholm Stein & Gratz, S.C.

(57) ABSTRACT

A V-rake includes a drawbar assembly adapted for connection to a tow vehicle, in combination with a transverse cross-member connected to the drawbar assembly. Wheels are mounted to the cross-member, to form a trolley for conveying the V-rake. A rake arm is mounted to each end of the cross-member, and includes a series of rake wheels. The rake arms are moveable relative to the cross-member between an open, operative position and a closed, transport position, and the rake wheels are moveable relative to the rake arms between a raised, inoperative position and a lowered, operative position. The transverse cross-member is a rigid, fixed-length member to increase the structural rigidity of the trolley. A windrow width adjusting arrangement is interconnected with the rake assembly, and includes a windrow forming rake assembly mounted to the transverse cross-member adjacent each end thereof Each windrow forming rake assembly includes a rake wheel mounted to an outer arm, which in turn is mounted to an inner arm pivotably mounted to the transverse cross-member for movement about a vertical pivot axis. In this manner, the windrow forming rake wheels can be moved together and apart to adjust the width of windrow formed between the windrow forming rake wheels. An adjustable length member, such as a turnbuckle or hydraulic cylinder assembly, is interposed between the transverse cross-member and each inner arm, for controlling the position of the windrow forming rake wheel. The outer arm is preferably mounted for pivoting movement to the inner arm about a substantially horizontal pivot axis, to enable the windrow forming rake wheels to be moved between a raised, inoperative position and a lowered, operative position in response to operation of an actuator associated with the rake for moving the rake wheels between the raised, inoperative position and the lowered, operative position.

19 Claims, 11 Drawing Sheets

U.S. PATENT DOCUMENTS

| | | | |
|---|---|---|---|
| 4,182,103 | * 1/1980 | McNutt | 56/364 |
| 4,183,198 | 1/1980 | Sligter . | |
| 4,245,458 | 1/1981 | Smith . | |
| 4,370,846 | 2/1983 | Arnold . | |
| 4,723,402 | 2/1988 | Webster et al. . | |
| 4,785,614 | 11/1988 | Schoenherr . | |
| 4,864,809 | * 9/1989 | Van Der Lely et al. | 56/377 |
| 4,932,197 | 6/1990 | Allen . | |
| 4,947,631 | 8/1990 | Kuehn . | |
| 4,974,407 | 12/1990 | Rowe et al. . | |
| 4,977,734 | 12/1990 | Rowe et al. . | |
| 5,062,260 | * 11/1991 | Tonutti | 56/380 |
| 5,065,570 | * 11/1991 | Kuehn | 56/377 |
| 5,127,216 | 7/1992 | Kelderman . | |
| 5,155,986 | 10/1992 | Kelderman . | |
| 5,177,945 | 1/1993 | Tonutti . | |
| 5,231,829 | 8/1993 | Tonutti . | |
| 5,263,306 | 11/1993 | Tonutti . | |
| 5,305,590 | 4/1994 | Peeters . | |
| 5,313,772 | 5/1994 | Tonutti . | |
| 5,404,702 | 4/1995 | Lewis . | |
| 5,493,853 | 2/1996 | Tonutti . | |
| 5,540,040 | 7/1996 | Peeters . | |
| 5,598,691 | * 2/1997 | Peeters | 56/377 |
| 5,685,135 | * 11/1997 | Menichetti | 56/365 |
| 5,918,452 | * 7/1999 | Kelderman | 56/377 |
| 5,930,988 | * 8/1999 | Hanson | 56/16.4 A |

* cited by examiner

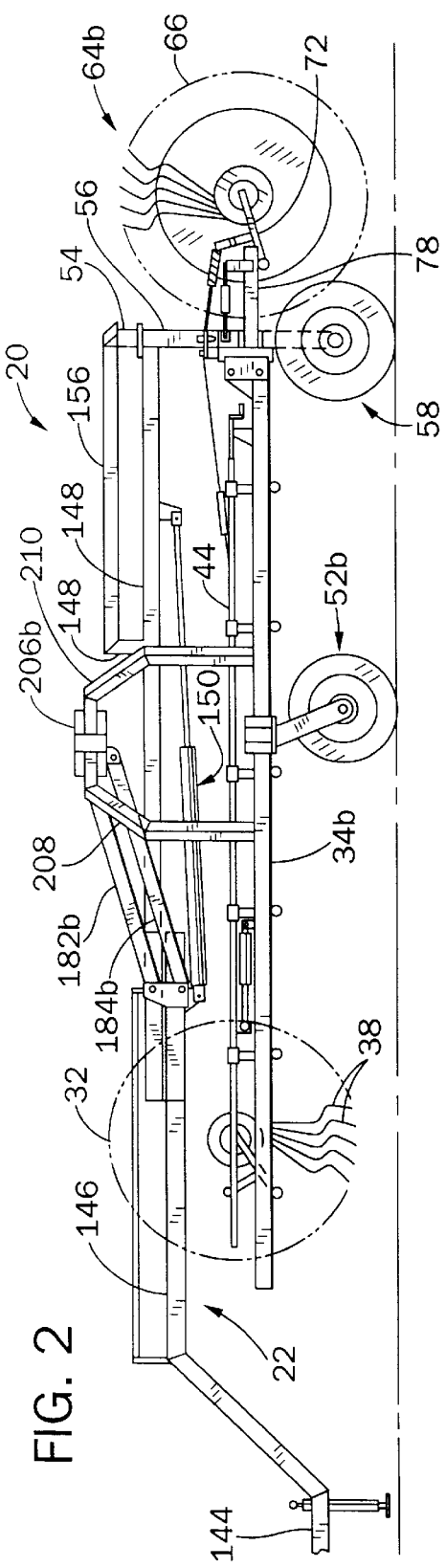
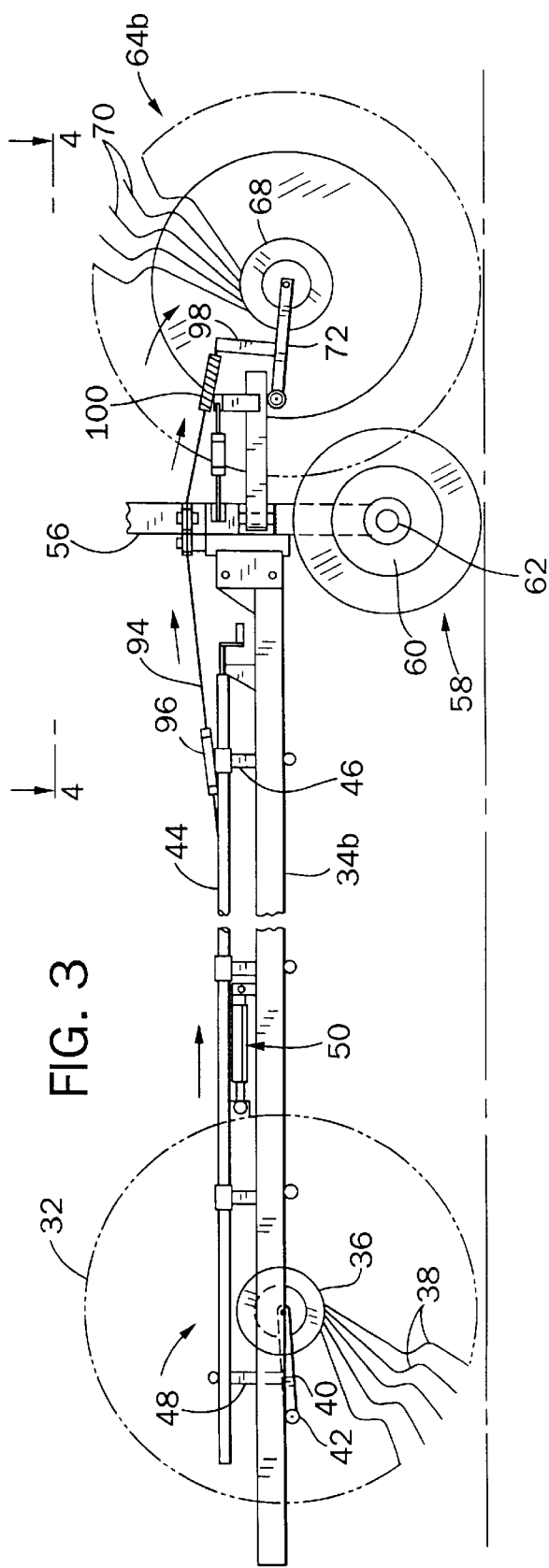
FIG. 2
FIG. 3

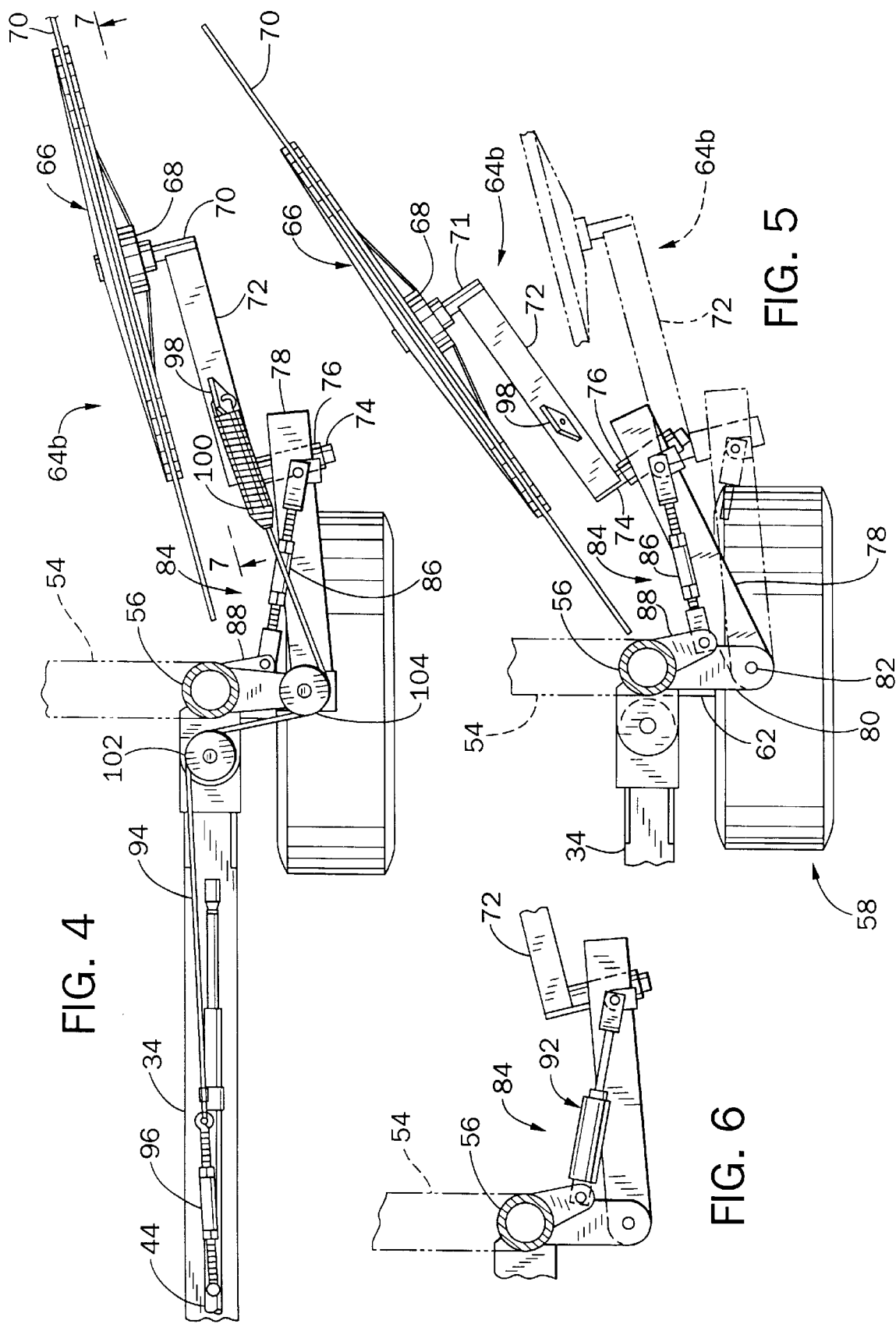

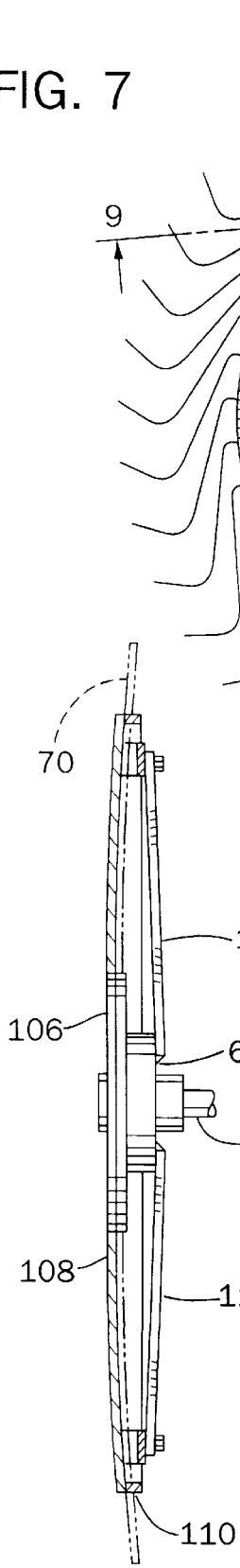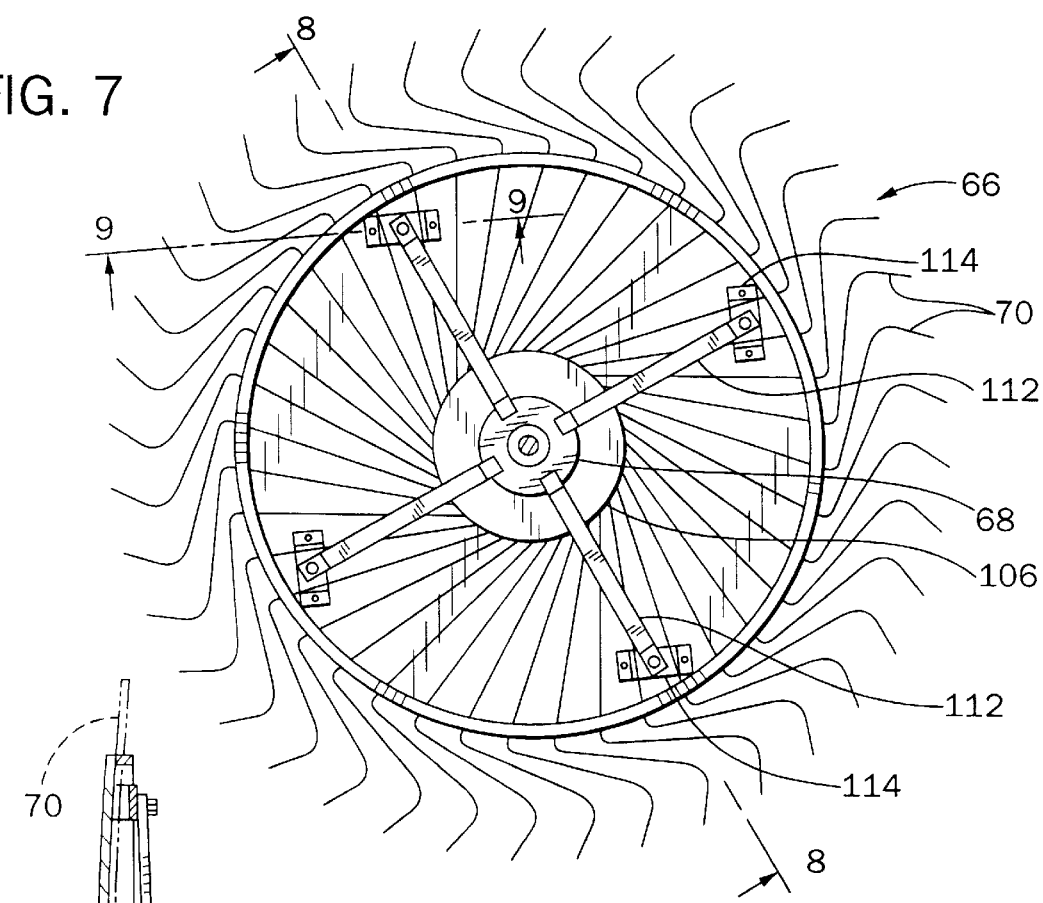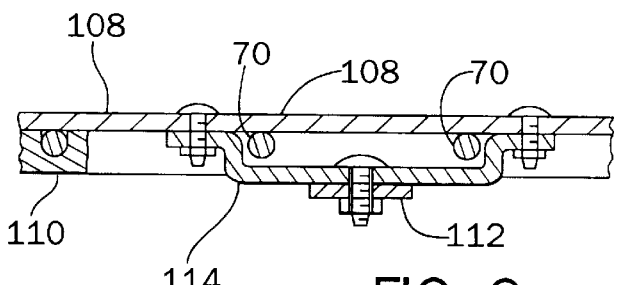

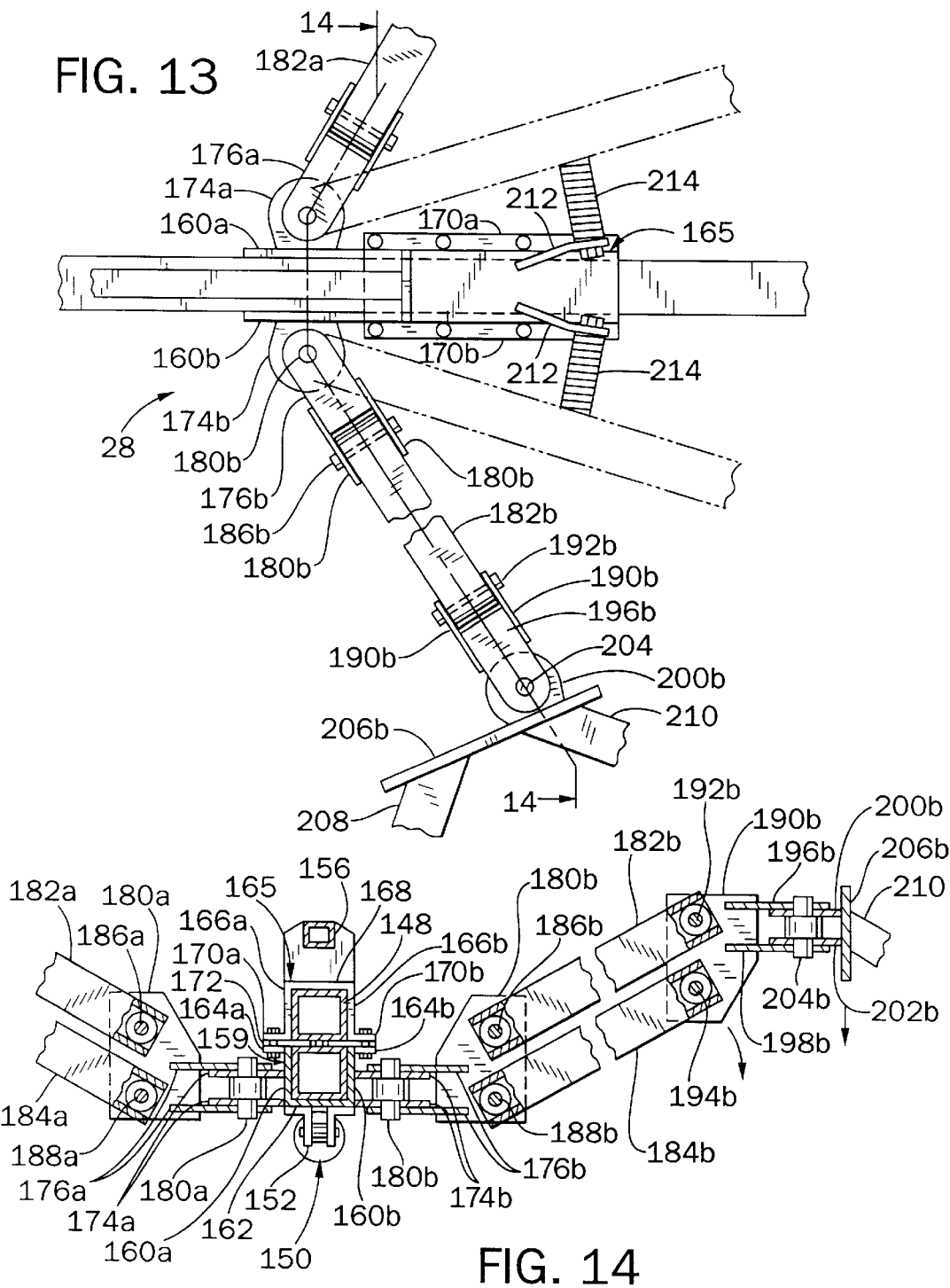

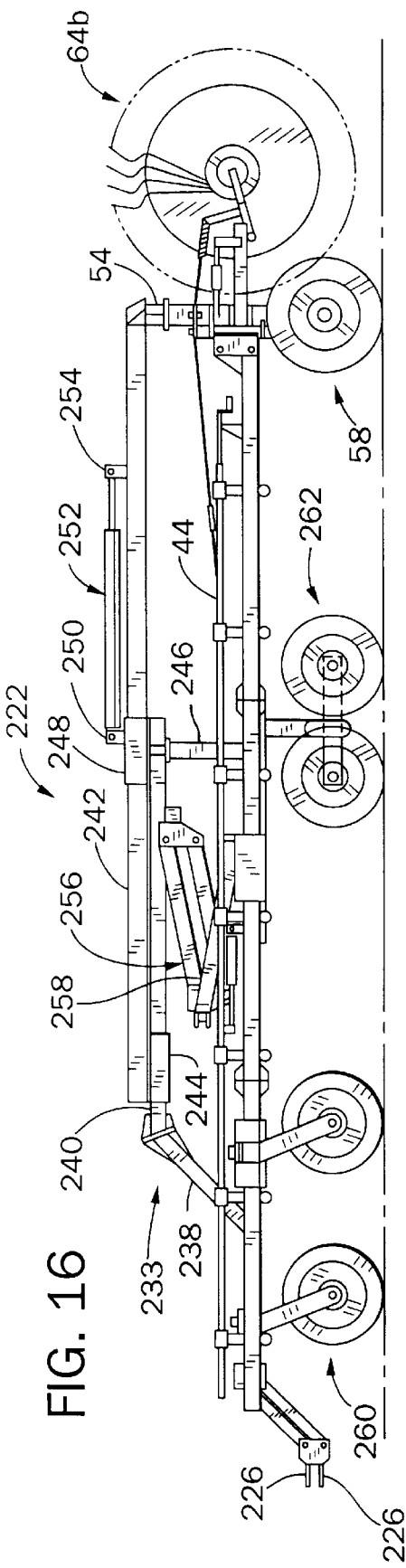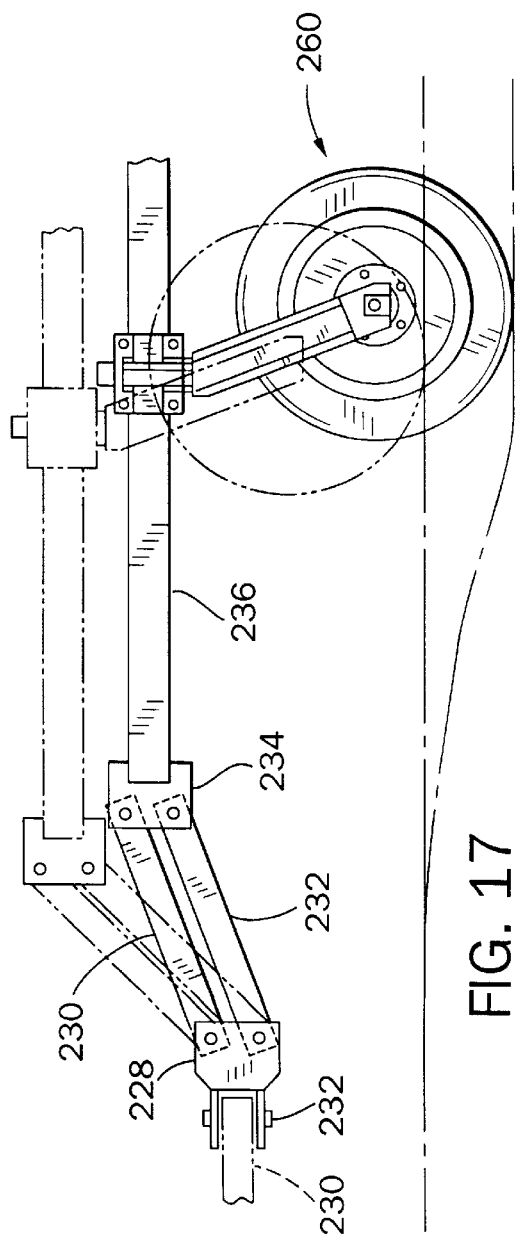
FIG. 16
FIG. 17

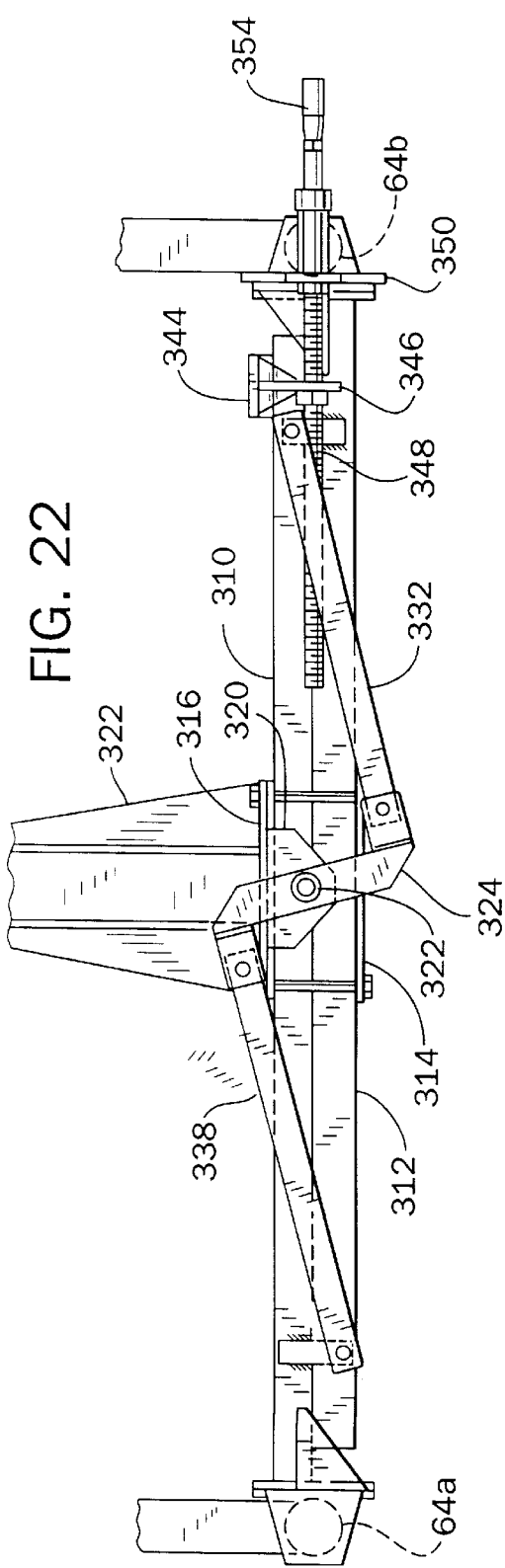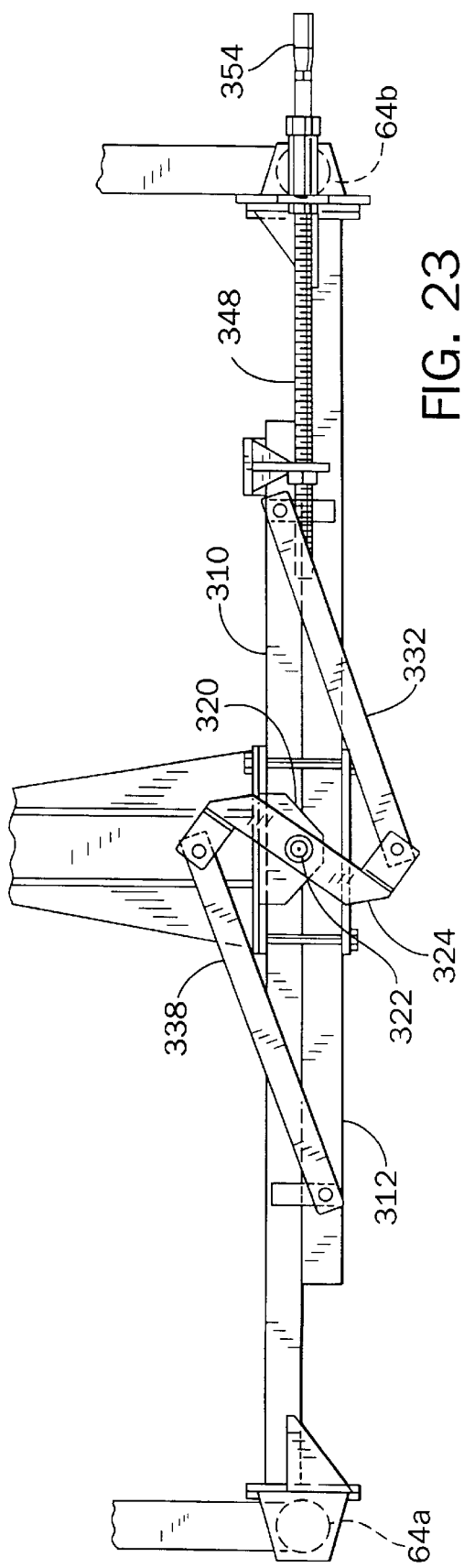

V-RAKE WITH WINDROW WIDTH ADJUSTMENT

BACKGROUND AND SUMMARY OF THE INVENTION

This invention relates to a rake for forming a windrow of agricultural crop material, and more particularly to a V-rake of the type having a pair of pivotable rake arms mounted to a trolley adapted to be towed behind a tow vehicle such as a tractor.

A foldable V-rake typically includes a trolley adapted for interconnection with a tow vehicle such as a tractor, with a pair of rake arms pivotably mounted to the trolley. In a typical embodiment, the trolley includes a cross-member, and each rake arm is pivotally mounted adjacent an end of the cross-member. An opening and closing mechanism is interconnected between the trolley and the rake arms for moving the rake arms between an open, operative position and a closed, transport position. Each rake arm carries a number of rake wheels, which are operable to direct crop material inwardly as the rake is pulled through a field.

Typically, the width of a windrow formed by the rake material is controlled by the width of the cross-member. That is, the innermost rake wheels are spaced apart from each other a distance dictated by the width of the cross-member, and the spacing of the innermost rake wheels controls the width of the windrow.

In the prior art, it is known to construct the cross-member of a pair of members which can be laterally displaced relative to each other and selectively locked in position, so as to adjust the effective width of the cross-member. In this manner, the windrow width is adjusted by selectively moving the innermost rake wheels toward and away from each other. While this arrangement has been found generally satisfactory, it is somewhat disadvantageous in that, when a relatively narrow windrow is to be formed, the overall working width of the rake is decreased by movement of the rake arms together when the effective length of the cross-member is shortened. In addition, the two-piece construction of the cross-member adversely effects the overall strength and rigidity of the trolley. Further, the prior art construction requires time and effort in adjusting the width of the cross-member, since such an adjustment entails movement of all components mounted to the cross-member, including wheels and the rake arms.

It is an object of the present invention to provide a windrow width adjusting arrangement for use with a foldable V-rake, in which the windrow width can be adjusted without adjusting the length of the cross-member or any other component of the trolley. It is a further object of the invention to provide such a windrow width adjusting arrangement in which the windrow width can be adjusted without movement of the rake arms relative to each other, so that the overall width of the rake is not reduced when forming a narrow windrow. It is a further object of the invention to provide a windrow width adjusting arrangement which can easily be employed with any type of V-rake incorporating a trolley carrying a rake arrangement. A still further object of the invention is to provide a windrow width adjusting arrangement which is relatively simple in its components and assembly, and which provides quick and easy windrow width adjustment.

In accordance with the invention, a rake includes a frame or trolley adapted for connection to a tow vehicle, and the frame or trolley includes a transverse member. A pair of rake arms are carried by the transverse member, and each rake arm has one or more rake members interconnected therewith for raking material inwardly. A pair of spaced windrow forming rake members are mounted to the transverse member. The windrow forming rake members include an adjustment arrangement for adjusting the spacing therebetween, to provide adjustment in the width of a windrow of material formed by the windrow forming rake members as the rake is towed by the tow vehicle. Each windrow forming rake member is preferably in the form of a rake wheel, and the adjustment arrangement is operable to selectively move the rake wheels toward and away from each other for adjusting the width of the windrow. The adjustment arrangement preferably includes an arm interconnected between at least one of the rake wheels and the transverse member. The arm is pivotably interconnected with the transverse member such that pivoting movement of the arm causes the windrow forming rake wheel to move toward and away from the other windrow forming rake wheel. The adjustment arrangement further includes an adjustable length member interconnected between the arm and the transverse member for controlling the position of the arm, and thereby the windrow forming rake wheel, relative to the transverse member. In one form, the adjustable length member may be a turnbuckle defining a first end interconnected with the arm and a second end interconnected with the transverse member. In another form, the adjustable length member may be an extendible and retractable cylinder assembly defining a first end interconnected with the arm and a second end interconnected with the transverse member.

The rake preferably also includes a lifting and lowering arrangement for moving the one or more rake members interconnected with the rake arms between an operative lowered position and an inoperative raised position. Each of the windrow forming rake members is interconnected with the transverse member so as to be moveable between an operative lowered position and an inoperative raised position in response to the lifting and lowering arrangement. Each windrow forming rake member is interconnected with the transverse member by means of a first arm interconnected with the transverse member, and a second arm interconnected with the first arm into which the windrow forming rake member is mounted. The second arm is pivotable relative to the first arm about a transverse pivot axis for providing movement of the windrow forming rake member between its operative lowered position and its inoperative raised position. In a preferred form, the first arm is pivotably interconnected with the transverse member for providing transverse movement of the windrow forming rake member, in a manner as summarized above. The lifting and lowering arrangement may be in the form of a rod interconnected with each rake arm and the rake members interconnected with the rake arm. Movement of the rod causes movement of the rake members between heir inoperative raised position and their operative lowered position. Each windrow forming rake member is also interconnected with the rod, for providing movement of the windrow forming rake member between its operative lowered position and its inoperative raised position. In a preferred form, a cable is interconnected with the rod, and defines a first end secured to the rod and a second end interconnected with the windrow forming rake member. As summarized above, the windrow forming rake member is mounted to a pivotable arm, and the second end of the cable is secured to the pivotal arm for causing pivoting movement of the pivotable arm in response to movement of the rod. A spring is preferably interposed between the windrow forming rake member and the cable, and an adjustment member, such as a turnbuckle, is interconnected with the cable for adjusting the vertical position of the windrow forming rake member.

The invention further contemplates a windrow width adjustment arrangement for connection to a rake and a method of providing a windrow width adjustment feature for a rake, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a side elevation view of the rake of FIG. 1, showing the arms folded and the rake members in the raised, inoperative position;

FIG. 3 is a partial side elevation view similar to FIG. 2, showing the rake wheels in a lowered, operative position;

FIG. 4 is a partial top plan view of the rake of FIG. 1, with reference to line 4—4 of FIG. 3, showing the windrow forming rake wheel in accordance with the present invention;

FIG. 5 is a partial top plan view similar to FIG. 4, showing movement of the windrow forming rake wheel inwardly to narrow the width of a windrow formed by the rake of FIG. 1;

FIG. 6 is a view similar to a portion of FIG. 5, showing an alternative embodiment for moving the windrow forming rake member inwardly and outwardly;

FIG. 7 is a section view taken along line 7—7 of FIG. 4, showing the construction of the windrow forming rake wheel;

FIG. 8 is a section view taken along line 8—8 of FIG. 7;

FIG. 9 is a partial section view taken along line 9—9 of FIG. 7;

FIG. 13 is a partial top plan view, with reference to line 13—13 of FIG. 10, showing a linkage arrangement for enabling the rake of FIG. 1 to follow the contours of uneven terrain;

FIG. 14 is a partial section view taken along line 14—14 of FIG. 13;

FIG. 16 is a side elevation view of the rake of FIG. 15;

FIG. 17 is a side elevation view of a portion of the rake of FIG. 15, with reference to line 17—17 of FIG. 15;

FIG. 22 is a top plan view of the windrow width adjusting arrangement of FIG. 21, showing the components thereof in a retracted position;

FIG. 23 is a view similar to FIG. 22, showing the components of the windrow width adjusting arrangement in an extended position;

DETAILED DESCRIPTION OF THE INVENTION

Figure 1:
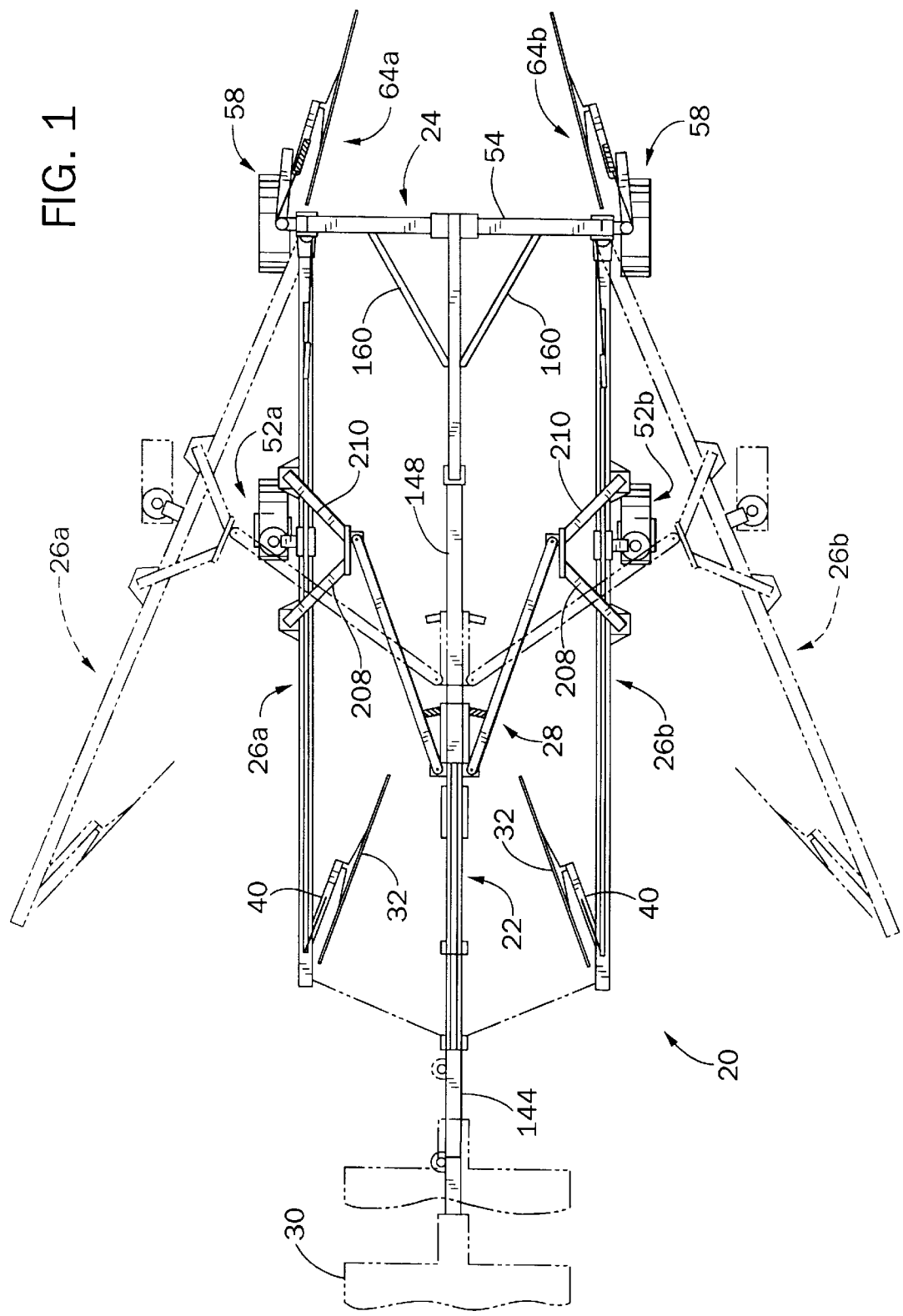
FIG. 1 is a top plan view of a rake constructed according to the invention, in which solid lines illustrate the rake arms in a folded, transport position and phantom lines indicate the rake arms in an open position.

Referring to FIG. 1, a foldable V-rake 20 generally includes a trolley made up of a drawbar assembly 22 and a transverse or cross-member assembly 24 mounted to the rearward end of drawbar assembly 22, in combination with a pair of rake arm assemblies 26a, 26b mounted one to each end of cross-member assembly 24. An opening and closing mechanism, showing generally at 28, is interposed between drawbar assembly 22 and rake arm assemblies 26a, 26b for moving rake arm assemblies 26a, 26b between a closed position, as shown in solid lines in FIG. 1, and an open position as show in phantom. In a manner as is known, drawbar assembly 22 is adapted for connection to a tow vehicle 30, such as a tractor, which is operable to draw V-rake 20 through a field of cut crop material so as to form a windrow of crop material.

Each rake arm assembly 26a, 26b includes a series of rake wheels 32 mounted along its length. The drawings illustrate the forwardmost one of rake wheels 32, and it is understood that additional rake wheels 32 are mounted to each of rake arm assemblies 26a, 26b throughout its length in the same orientation and manner as the illustrated rake wheel 32.

Referring to FIGS. 2 and 3, rake arm assemblies 26a, 26b include arms 34a, 34b, respectively, to which rake wheels 32 are mounted. The following description refers to rake arm 34b, and it is understood to apply with equal force to rake arm 34a.

In a manner as is known, each rake wheel 32 includes a hub 36 and a series of tines 38 extending outwardly from hub 36. Each rake wheel 32 is mounted to rake arm 34b via a mounting arm 40 which is secured to rake arm 34b via a pivot connection 42. An actuator rod 44 is slidably mounted to rake arm 34b via a series of brackets 46, and is slidable in a longitudinal direction parallel to the longitudinal axis of rake arm 34b. A connector 48 extends between actuator rod 44 and each mounting arm 40. A cylinder assembly 50 has its cylinder end connected to rake arm 34 and its rod end connected to actuator rod 44, such that extension of the rod of cylinder assembly 50 causes forward movement of actuator rod 44 and retraction of the rod of cylinder assembly 50 causes rearward movement of actuator rod 44. In this manner, extension of cylinder assembly 50 results in movement of rake wheels 32 to a raised position as illustrated in FIG. 2, and retraction of cylinder assembly results in movement of rake wheels 32 to a lowered position as shown in FIG. 3, by pivoting movement of each mounting arm 40 about its pivot connection 42.

As shown in FIGS. 1–3, ground-engaging wheel assemblies 52a, 52b are mounted to each of rake arm assemblies 26a, 26b, respectively, for supporting rake arm assemblies 26a, 26b as V-rake 20 is moved along the ground. Rear cross-member assembly 24 includes a rigid, fixed-length transverse member 54 in combination with a pair of depending vertical end members 56. Each end member 56 extends downwardly from an end of transverse member 54, such that transverse member 54 and end members 56 together define an inverted U-shaped assembly. A ground-engaging wheel assembly 58 is mounted to the lower end of each end member 56, for supporting the rearward end of V-rake 20. In a manner as is known, each wheel assembly 58 includes a hub 60 rotatably mounted to a horizontal axle 62 mounted to and extending outwardly from the lower end of each end member 56, for rotatably mounting wheel assembly 58 to end member 56.

Referring to FIG. 1, a pair of windrow forming rake assemblies, shown generally at 64a, 64b, are mounted one to each end of cross-member assembly 24. The construction and operation of windrow forming rake assembly 64b is illustrated in FIGS. 2–5, and it is understood that the following description of windrow forming rake assembly 64b applies equally to windrow forming rake assembly 64a.

As shown in FIGS. 2–5, windrow forming rake assembly 64b includes a rake wheel 66 having a hub 68 and a series of tines 70 extending therefrom. Additional construction details of rake wheel 66 will later be explained. Rake wheel hub 68 is rotatably mounted to an axle 71, which in turn is secured to and extends inwardly from the outer end of an outer mounting arm 72. A pivot shaft 74 is secured to and extends outwardly from the inner end of outer mounting arm 72, and extends along an axis substantially parallel to the longitudinal axis of axle 71. Pivot shaft 74 is received within and extends through a sleeve 76 mounted toward the outer end of an inner mounting arm 78. With this arrangement, outer mounting arm 72 is pivotable relative to inner mounting arm 78 about a substantially horizontal pivot axis defined by the longitudinal axis of pivot shaft 74 and the internal passage of sleeve 76 within which pivot shaft 74 is received.

Inner mounting aim 78 is pivotably mounted at its inner end to a bracket 80 extending outwardly from end member 56. A vertical pivot pin 82 is engaged with bracket 80 toward its outer end and extends through a vertical passage formed in the inner end of inner mounting arm 78, so as to mount inner mounting arm 78 to bracket 80 for movement about a vertical pivot axis defined by the longitudinal axis of pivot pin 82.

Referring to FIGS. 4 and 5, windrow forming rake assembly 64b is moveable about pivot pin 82 for adjusting the position of rake wheel 66 so as to provide adjustment in the width of a windrow of material formed by a windrow forming rake assemblies 64a, 64b as V-rake 20 is drawn across a field of cut material. FIG. 4 illustrates windrow forming rake assembly 64b in an outer position for forming a relatively wide windrow, and FIG. 5 illustrates windrow forming rake, assembly 64b in an inward position for decreasing the width of a windrow.

An adjustable length member, shown generally at 84, is interposed between inner mounting arms 78 and end member 56 for selectively fixing the position of inner mounting arms 78 relative to pivot pin 82. As illustrated in FIGS. 4 and 5, adjustable length member 84 is in the form of a turnbuckle assembly 86 having an inner end pivotably mounted to an ear 88 extending from end member 56, and having an outer end pivotably mounted to a bracket 90 connected to and extending upwardly from inner mounting arm 78. With this arrangement, the length of turn buckle 86 can be manually adjusted in a manner as is known, which results in selective inward and outward movement of inner mounting arm 78, and thereby rake wheel 66, for adjusting the lateral position of windrow forming rake assembly 64b.

FIG. 6 illustrates an alternative embodiment for adjustable length member 84. In this embodiment, a hydraulic cylinder assembly 92 is interconnected between ear 88 and bracket 90, such that selective extension and retraction of the rod of cylinder assembly 92 results in outward and inward movement of inner mounting arm 78, and thereby rake wheel 66.

Rake wheel 66 is moveable about a horizontal pivot axis defined by pivot shaft 74 between a raised position as shown in FIG. 2 and a lowered position as shown in FIG. 3, in response to movement of actuator rod 44. The forward end of a cable 94 is connected to actuator rod 44 via a turnbuckle assembly 96. A connector 98 is mounted to and extends upwardly from outer mounting arm 72, and the rearward end of cable 94 is engaged with connector 98 through a spring 100. Between its inner and outer ends, cable 94 is engaged with a pair of pulleys 102, 104 which are mounted to end member 56.

With this arrangement, forward movement of actuator rod 44 to raise rake wheels 32 is translated through cable 94 to outer mounting arm 72, which results in upward pivoting movement of outer mounting arm 72 about the horizontal pivot axis defined by pivot shaft 74, to raise rake wheel 66 upwardly as shown in FIG. 2. Rearward movement of actuator rod 44 to lower rake wheels 32 enables rake wheel 66 to be lowered under the influence of gravity as cable 94 moves rearwardly as a result of rearward movement of actuator rod 44. In this manner, rake wheel 66 is raised and lowered simultaneously with rake wheels 32 in response to movement of actuator rod 44.

Manual adjustment in the length of turnbuckle assembly 96 results in relative upward or downward adjustment in the position of rake wheel 66, to insure that rake wheel 66 is at the proper vertical position for forming a windrow of material during forward movement of V-rake 20, In addition, spring 100 accommodates pivoting of outer mounting arm 72 as rake wheel 66 encounters obstructions on the ground, while maintaining sufficient tension in cable 94 to insure cable 94 remains in engagement with pulleys 102, 104.

FIGS. 7–9 illustrate the construction of rake wheel 66. As noted previously, rake wheel 66 includes a hub 68 rotatably engaged with an axle 71.

A plate 106 extends outwardly from hub 68, and the inner end of each of tines 70 is mounted to plate 106. A disc 108 extends outwardly from plate 106, and a rim 110 is mounted to the outer periphery of disc 108. A series of braces 112 are each mounted at an inner end to hub 68, and terminate in an outer end secured to a bracket 114 which bridges a pair of adjacent tines 70 and is mounted to disc 108. This provides a reinforced construction for rake wheel 66, and disc 108 prevents crop material from being entrapped in the spaces between tines 70 adjacent hub 68. The bent outer end portion of each tine 70 extends outwardly from rim 110, and is deflectable upon engagement with the ground so as to insure proper raking of material as V-rake 20 is pulled along the ground.

Figure 10:
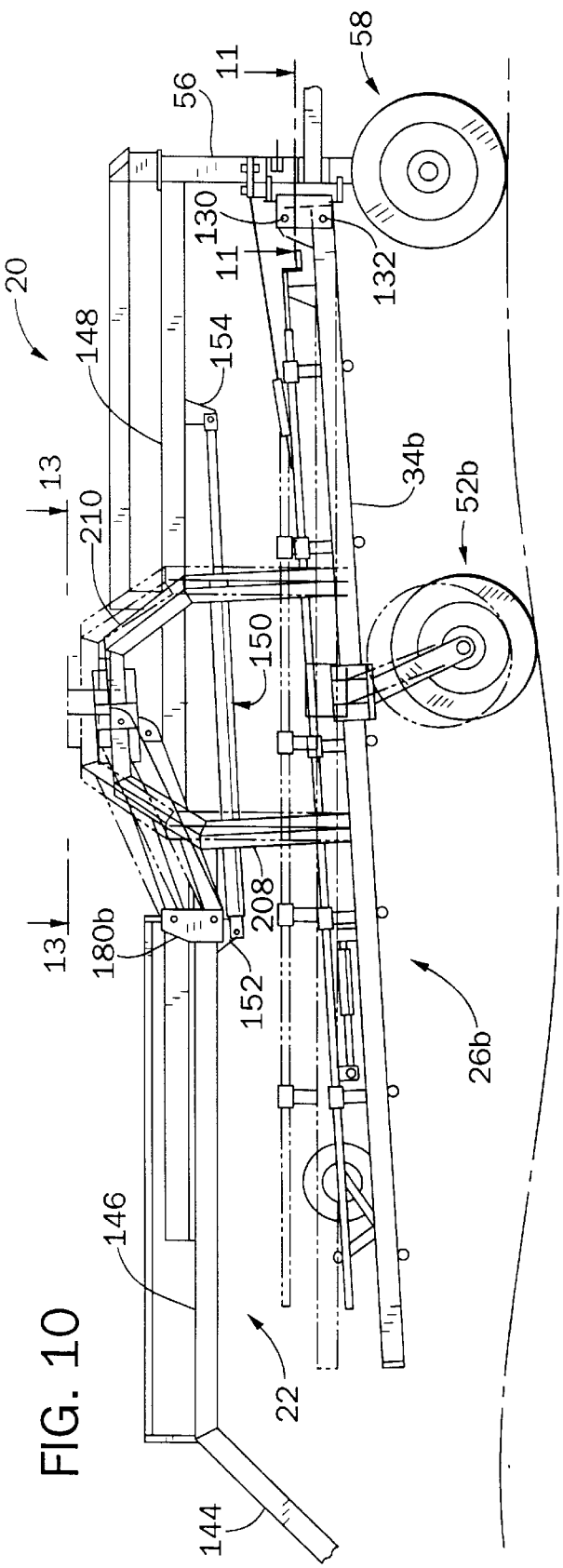
FIG. 10 is a side elevation view similar to FIG. 2, showing movement of the rake components as the rake is moved along uneven terrain.

FIGS. 2 and 10 illustrate a side elevation of V-rake 20, with FIG. 10 showing movement of the components of V-rake 20 as it is drawn along an uneven ground surface.

Figure 11:
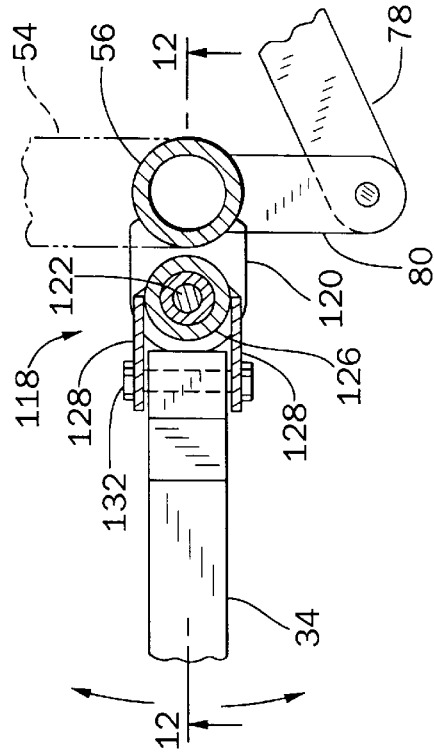
FIG. 11 is a partial section view taken along line 11—11 of FIG. 10.
Figure 12:
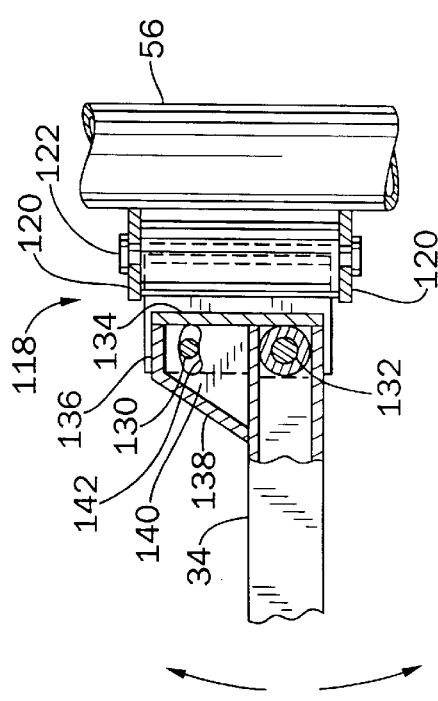
FIG. 12 is a partial section view taken along line 12—12 of FIG. 11.

FIGS. 10–12 show the manner in which rake arm assemblies 26a, 26b move vertically in order to accommodate n uneven ground surface. The following is a description of mounting and movement of rake arm assembly 26b, and it is understood that this description applies equally to mounting and movement of rake arm assembly 26a.

Arm 34b of rake arm assembly 26b is mounted to end member 56 via a hinge connection, shown generally at 118. Hinge connection 118 includes a pair of horizontal ears 120, each of which is mounted at its outer end to end member 56. A vertical hinge pin 122 extends between ears 120, and a bearing tube 124 is disposed between ears 120 and defines an internal passage through which hinge pin 122 extends. A pivot tube 126 surrounds bearing tube 124, and a pair of hinge plates 128 are mounted to the opposite sides of pivot tube 126. Upper and lower fixed-position horizontal pins 130, 132, respectively, extend between hinge plates 128.

Horizontal openings are formed in the wall of rake arm 34 toward its rearward end, and lower pin 132 extends therethrough, as shown in FIG. 12. In this manner, the longitudinal axis of lower pin 132 defines a horizontal pivot axis for rake arm 34b. A gusset assembly is mounted to the rearward end of rake arm 34b, including a rear plate 134 connected at its lower end to the rear end of rake arm 34 and extending upwardly therefrom, a top plate 136 extending forwardly from the upper end of rear plate 134, and a front plate 138 extending between the forward end of top plate 136 and the upper surface of rake arm 34. A pair of side plates, one of which is shown at 140, are connected to the edges of rear plate 134, top plate 136 and front plate 138, as well as to rake arm 34. An arcuate slot 142 is formed in each side plate 140, and upper horizontal pin 130 extends through the aligned slots 142.

With the construction as shown and described, rake arm 34b is pivotable relative to end member 56 about a vertical pivot axis defined by hinge pin 122, to provide movement of rake arm assembly 26b between its open and closed positions. In addition, rake arm 34b is pivotable about a horizontal pivot axis defined by lower horizontal pin 132, throughout a range of movement as defined by engagement of upper horizontal pin 130 with the ends of slot 142. As shown in FIG. 10, this movement of rake arm 34b about lower horizontal pin 132 enables wheel assembly 58 to follow the ground contours as V-rake 20 is moved along the ground, resulting in pivoting movement of rake arm 34b and enabling rake wheels 32 to maintain contact with the ground in uneven terrain.

Referring to FIGS. 1, 2 and 10, drawbar assembly 22 includes a tongue 144 adapted for connection to the hitch of tow vehicle 30, which extends upwardly and is connected to a front drawbar member 146. A rear drawbar member 148 overlaps front drawbar member 146, and extends rearwardly therefrom for connection at its rearward end to transverse member 54. Front and rear drawbar members 146, 148, respectively, are mounted for telescoping movement relative to each other. A hydraulic cylinder assembly, shown at 150, is interconnected between front drawbar member 146 and rear drawbar member 148. The cylinder end of hydraulic cylinder assembly 150 is connected to a tab 152 mounted to the underside of front drawbar member 146, and the rod end of hydraulic cylinder assembly 150 is connected to a tab 154 mounted to the underside of rear drawbar member 148. With this arrangement, extension of hydraulic cylinder assembly 150 causes rear drawbar member 158 to move rearwardly relative to front drawbar member 146, and retraction of hydraulic cylinder assembly 150 causes forward movement of rear drawbar member 148 relative to front drawbar member 146.

As shown in FIG. 2, a horizontal reinforcement member 156 extends forwardly from transverse member 54 and is connected through a vertical member 158 to rear drawbar member 148, for strengthening the rearward end of rear drawbar member 148. As shown in FIG. 1, a pair of angled reinforcement members 160 extend between rear drawbar member 148 and transverse member 54, for reinforcing the connection therebetween.

Opening and closing mechanism 28 is responsive to relative movement between rear drawbar member 148 and front drawbar member 146 as described above, to provide movement of rake arm assemblies 26a, 26b between their closed and open positions. Referring to FIGS. 13 and 14, opening and closing mechanism 28 includes a channel member 159 secured to front drawbar member 146, which defines a pair of side walls 160a, 160b and a bottom wall 162 to which tabs 152 are mounted. A pair of flanges 164a, 164b extend outwardly from the upper ends of sidewalls 160a, 160b, respectively, at a location spaced rearwardly from the forward end of channel member 159. An inverted channel 165 is mounted to channel 159, and defines a pair of side walls 166a, 166b and a top wall 168 extending therebetween. Flanges 170a, 170b extend outwardly from the lower ends of side walls 166a, 166b, respectively. A slide plate 172 is located between flanges 170a, 170b and 164a, 164b, and bolt and nut assemblies extend between and interconnect flanges 164a, 164b and 170a, 170b, respectively, with slide plate 172 sandwiched therebetween.

Channel 159 is rigidly mounted to, and fixed in position relative to, front drawbar member 146, and rear drawbar member 148 is slidable within the space defined by upper channel member 165 and slide plate 172.

A pair of vertically spaced horizontal plates 174a are mounted to and extend laterally from side wall 160a of lower channel 159. Similarly, a pair of vertically spaced horizontal plates 174b are mounted to and extend laterally from side wall 160b of lower channel 159. Aligned vertical openings are formed in plates 174a and a pair of plates 176a are engaged over plates 174a and define aligned vertical openings in alignment with those formed in plates 174a. Similarly, a pair of vertically spaced horizontal plates 176b are located over plates 174b, and define vertically aligned openings in alignment with those formed in horizontal plates 174b. A vertical pivot pin 178a extends through the aligned openings in plates 174a and 176a, and defines shoulders in engagement with the facing inside surfaces of plates 174a. Similarly, a vertical pivot pin 180b extends through the aligned openings in plates 174b and 176b, and defines shoulders in engagement with the facing inside surfaces of plates 174b. With this arrangement, plates 176a are pivotable relative to drawbar members 146, 148 about a pivot axis defined by pin 180a, and plates 176b are similarly pivotable about a vertical pivot axis defined by pivot pin 180b. A pair of vertical hinge plates 180a are mounted to horizontal plates 176a, and a pair of vertical hinge plates 180b are mounted to horizontal plates 176b.

A link arm 182a is pivotably mounted between hinge plates 180a for pivoting movement about a horizontal pivot axis defined by a horizontal pivot pin 186a, and a link arm 184a is pivotably mounted between hinge plates 180a for pivoting movement about a horizontal pivot axis defined by a horizontal pivot pin 188a. Similarly, a link arm 182b is pivotably mounted between hinge plates 180b for pivoting movement about a horizontal pivot axis defined by a horizontal pivot pin 186b, and a link arm 184b is located below link arm 182b and is pivotably mounted between hinge plates 180b for movement about a horizontal pivot axis defined by a horizontal pivot pin 188b.

As shown in FIG. 14, the outer ends of link arms 182b, 184b are mounted between a pair of outer hinge plates 190b for movement about horizontal pivot axes defined by pivot pins 192b, 194b, respectively. Outer hinge plates 190b, in turn, are mounted to a pair of vertically spaced horizontal plates 196b, 198b, which overlie a pair of vertically spaced horizontal plates 200b, 202b. Aligned vertical openings are formed in plates 196b and 198b, as well as in plates 200b, 202b, and a pivot pin 204 is received within the aligned vertical openings for providing pivoting movement of outer hinge plates 190b about a vertical axis defined by pivot pin 204. A vertical plate 206b is mounted to the outer ends of horizontal plates 200b, 202b, and a pair of struts 208b, 210b (FIGS. 1,2) extend between vertical plate 206b and rake arm 34b, for rigidly mounting vertical plate 206b to rake arm 34b at a location spaced vertically above rake arm 34b.

In the same manner as described with respect to interconnection of link arms 182b, 184b with rake arm assembly 26b, it is understood that link arms 182a, 184a are similarly interconnected with rake arm assembly 26a.

With the construction as shown and described, opening and closing mechanism 28 functions as follows to move rake arm assemblies 26a, 26b between their open and closed positions.

Hydraulic cylinder assembly 150 is moved to its extended position as shown in FIG. 2 in order to place V-rake 20 in its transport position of FIG. 1. When it is desired to move rake arm assemblies 26a, 26b to their open position as shown in phantom in FIG. 1, hydraulic cylinder assembly 150 is moved from its extended position of FIG. 2 to its retracted position of FIG. 10. As hydraulic cylinder assembly 150 is retracted, rear drawbar member 148 is moved forwardly relative to front drawbar member 146 through upper channel 165, which draws transverse member 54 forwardly, and causes rake arm assemblies 26a, 26b to be drawn forwardly. With reference to rake arm assembly 26b, this causes pivoting movement of link arms 182b, 184b about the vertical pivot axis defined by pivot pins 180b and 204b through hinge plates 180b, 190b, respectively, and horizontal plates 176b and 196b, respectively. Simultaneously, rake arm assembly 26b pivots about the vertical pivot axis defined by hinge pin 122, to move rake arm assembly 26b to its open position. The same sequence of events occurs with respect to rake arm assembly 26a, such that rake assemblies 26a, 26b are pivoted outwardly to their open position as shown in phantom in FIG. 1 and as illustrated in FIG. 10. This sequence of event is reversed in order to move rake arm assemblies 26a, 26b to their closed position.

Referring to FIG. 13, a pair of stop plates 212 are mounted to upper channel 165, and a spring 214 is mounted to and extend outwardly form each stop plate 212. Springs 214 function to cushion link members 182a, 182b as rake arms 26a, 26b are closed, and also provide an outward biasing force thereon to assist in moving rake arms 26a, 26b outwardly.

As noted above with respect to FIG. 10, rake arm assemblies 26a, 26b are pivotable about a horizontal pivot axis defined by lower horizontal pin 132 for accommodating uneven terrain. In addition, link arms 182a, 184a and 182b, 184b accommodate such pivoting movement of rake arm assemblies 26a, 26b, and also accommodate variations in terrain between tow vehicle and V-rake 20. In this manner, rake arm assemblies 26a, 26b are able to closely follow the ground contour, even in terrain which is very uneven, so as to insure that substantially all cut material is raked into a windrow.

Figure 15:
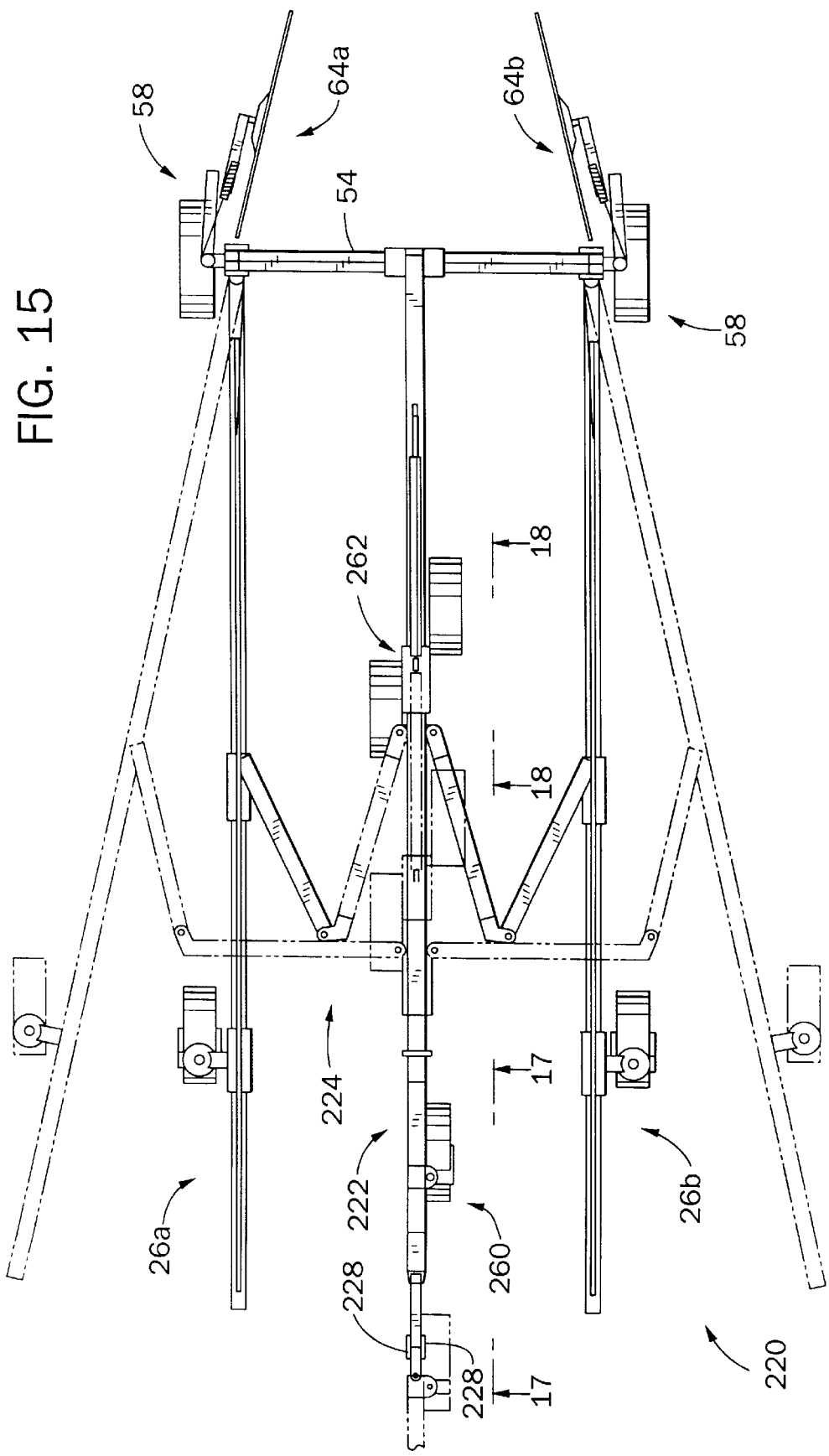
FIG. 15 is a top plan view of an alternative embodiment of a V-rake constructed according to the invention.

FIGS. 15–17 illustrate a low profile V-rake 220 which is an alternate embodiment of the present invention, and like reference characters will be used where possible to facilitate clarity. V-rake 220 includes a pair of rake arm assemblies 26a, 26b mounted to transverse member 54 in the same manner as shown and described previously. Wheel assemblies 58 and windrow forming rake assemblies 64a, 64b are also mounted to transverse member 54 in the same manner as shown and described previously. V-rake 220 is well suited for especially hilly terrain, and includes an alternative drawbar assembly 222 and opening and closing mechanism 224 from the prior embodiment.

Referring to FIGS. 16 and 17, drawbar assembly 222 includes a pair of parallel hitch plates 226 which are rigidly connected to and extend forwardly from a pair of spaced, forward vertical plates 228. Hitch plates 226 are adapted for engagement with the hitch of a tow vehicle, shown at 230, via a hitch pin 232 which extends through aligned openings in hitch plates 226 and hitch 230.

A linkage, in the form of an upper link member 230 and a lower link member 232, is mounted between front vertical plates 228 and a pair of rear vertical plates 234. A front drawbar assembly 233 is mounted to and extends rearwardly from rear vertical plates 234, and includes a lower horizontal section 236, an angled intermediate section 238 extending upwardly from lower horizontal section 236, and an upper horizontal section 240 extending rearwardly from the upper end of angled intermediate section 238.

Drawbar assembly 222 fuirher includes a rear drawbar member 242 which is connected at its rearward end to transverse member 54. A sleeve 244 is mounted to the forward end of rear drawbar member 242, and defines a passage through which upper horizontal section 240 of front drawbar member extends.

A pedestal 246 extends upwardly from the rearward end of lower horizontal section 236. Pedestal 246 supports the rearward end of upper horizontal section 240, as well as a stationary sleeve 248. A tab 250 is mounted to the upper wall of sleeve 248, and the cylinder end of a hydraulic cylinder assembly 252 is mounted to tab 250. The rod end of hydraulic cylinder assembly 252 is connected to a tab 254, which extends upwardly from rear drawbar member 242. With this construction, extension of hydraulic cylinder assembly 252 results in rearward movement of rear drawbar member 242 relative to upper horizontal section 240 of front drawbar assembly 233. With this construction, extension and retraction of hydraulic cylinder assembly 252 results in relative movement between rear drawbar member 242 and front draw bar assembly 233, to selectively move rake arms 26a, 26b between their open and closed positions. A linkage 256 and strut 258 are interposed between upper horizontal 240 of front drawbar assembly 233 and each of rake arm assemblies 26a, 26b, and operate in the same manner as described previously to accommodate upward and downward movement of rake arm assemblies 26a, 26b as V-rake 222 traverses uneven terrain. In addition, the drawbar linkage made up of upper link member 230 and lower link member 232 accommodate uneven terrain between V-rake 222 and the tow vehicle, to provide further assurance that the rake wheels maintain contact with the ground in uneven terrain.

In this embodiment, a wheel assembly 260 is mounted to the drawbar forward section to support drawbar assembly 222 at its forward end. In addition, a tandem wheel assembly 262 is mounted to the rear end of lower horizontal section 236 of the front drawbar assembly. As shown in FIG. 16, tandem wheel assembly 262 is mounted to lower horizontal section 236 of the front drawbar assembly slightly rearwardly of the center of V-rake 220.

Figure 18:
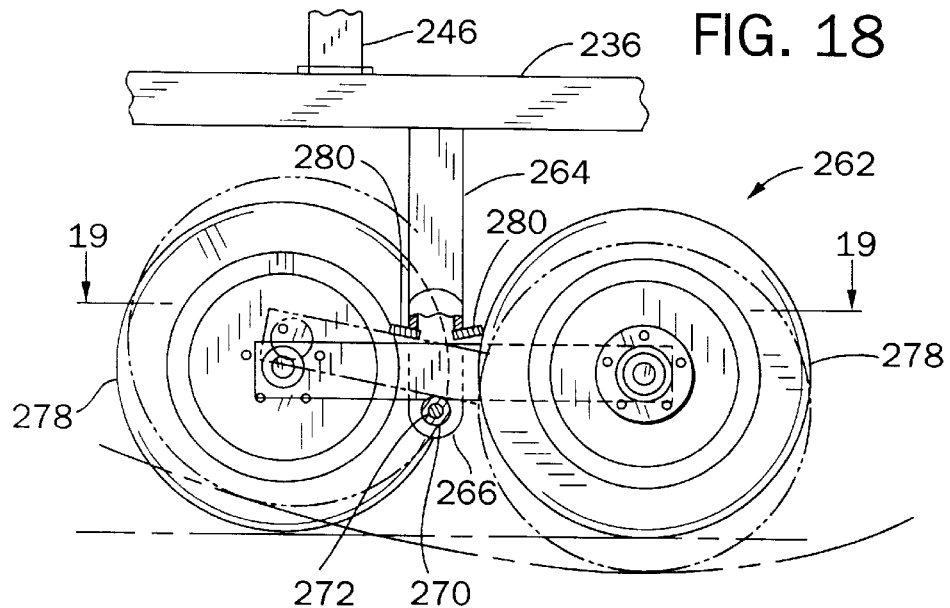
FIG. 18 is a side elevation view of a portion of the rake of FIG. 15, with reference to line 18—18 of FIG. 15.
Figure 19:
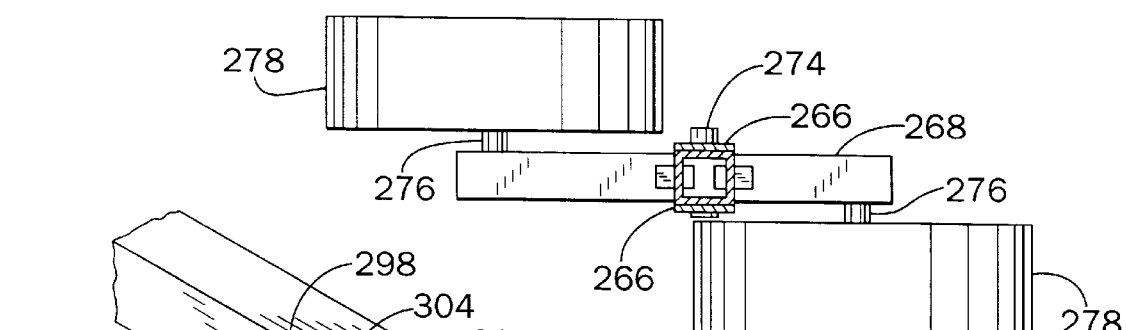
FIG. 19 is a section view taken along line 19—19 of FIG. 18.

FIGS. 18 and 19 illustrate tandem wheel assembly 262 in detail. As shown in FIGS. 18 and 19, tandem wheel assembly 262 includes a strut 264 extending downwardly from lower horizontal drawbar section 236. Each of a pair of side plates 266 is welded at its upper end to one side of strut 264, extending downwardly from the lower end of strut 264. A wheel-mounting beam or bar 268 is located between side plates 266. A tube 270 is mounted to the underside of bar 268, and the shaft 272 of a bolt 274 extends through the passage defined by tube 270. In this manner, bar 268 is pivotable about a horizontal pivot axis defined by shaft 272, to provide oscillating movement of bar 268 relative to strut 264. Axles 276 are mounted one adjacent each end of bar 268, extending in opposite directions therefrom, and a wheel assembly 278 is rotatably mounted to each axle 276. A pair of stop plates 280 are mounted to the lower end of strut 264, for engaging bar 268 to limit rotational movement of bar 268 about the pivot axis defined by shaft 272.

Figure 20:
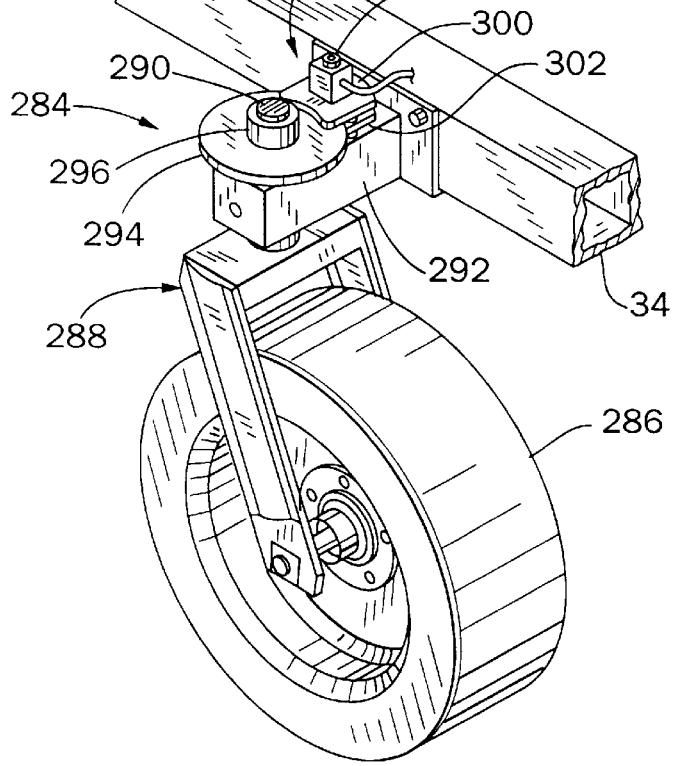
FIG. 20 is a partial isometric view showing a wheel mounting arrangement for the rake of the invention.

With this construction, the oscillating capability of bar 268 enables wheel assemblies 278 to maintain in contact with the ground when traveling over uneven terrain. The orientation of wheel assemblies 278 in line with the desired direction of movement of V-rake 20 allows V-rake 20 to maintain alignment with tractor direction and to prevent lateral sliding of V-rake 220 when moving on the side of a hill or other incline. Wheel assemblies 278 allow ground contour to be followed, and avoid holes or small ditches in the terrain and prevent V-rake 220 from swaying. FIG. 20 illustrates a wheel blocking system 284 for use in mounting the wheel assemblies, such as 52a, 52b, or 222 which support the rake arms, drawbar assembly or transverse member of V-rake 20,220. In this arrangement, a ground wheel assembly, shown at 286, is mounted to a rake component, such as a rake arm 34, by means of a fork assembly 288 having a shaft 290 extending upwardly therefrom and mounted for pivoting movement within a mounting member 292 secured to rake arm 34. In this manner, fork 288 is pivotable relative to mounting member 292 about a vertical axis defined by shaft 290, for allowing wheel assembly 286 to turn when desired, such as when rake arm 34 is being moved between its open and closed positions or when the rake is being turned. Blocking system 284 is utilized when it is desired to maintain the direction of wheel assembly 286 in a predetermined orientation relative to the member, such as rake arm 34, to which the wheel assembly 286 is mounted. For example, when rake arm 34 is in its open position, blocking system 284 can be utilized to insure that wheel assembly 286 is always oriented in the same direction of travel as movement of the tow vehicle, to prevent lateral movement of the rake when traversing a hillside or other incline.

Blocking system 284 contemplates mounting a disc 294 to spindle 290 via a hub 296. A clutch assembly 298 is secured to mounting member 292. Clutch assembly 298 includes upper and lower plates 300, 302, respectively, which define a space within which disc 294 is received. Clutch assembly 298 flier includes an actuator 304 which is operable to selectively move upper and lower plates 300, 302 together to frictionally engage disc 294 and to prevent its rotation, thereby preventing rotation of shaft 290 and fixing the direction of wheel assembly 286. Actuator 304 may be operated when desired, such as at all times when the rake is open so as to insure that the ground-engaging wheels are always pointed in the same direction as the wheels of the tow vehicle. Alternatively, actuator 304 can be operated selectively by an operator, such as when the operator detects a tendency of the rake to move laterally, to apply blocking system 284 to insure the rake travels in the desired direction.

FIGS. 21–25 illustrate a split transverse member, shown at 54', which includes a mechanism for selectively adjusting the windrow width by adjusting the effective length of transverse member 34'. Typically, a windrow width adjusting system of this type is employed when windrow forming rake assemblies 64a, 64b are not used.

In the past, it has been known to utilize a transverse member construction in which the distance between the end members, such as shown at 56a, 56b, can be varied to vary the spacing between the rearward most rake to adjust the windrow formed thereby. These prior art systems have involved independent lateral movement of each rake arm assembly, which typically involves a manual adjustment in the connection of the rake arm assembly to the transverse member. While systems of this type are useful for adjusting windrow width, such systems involve significant time and effort in loosening and retightening the rake arm connection. Further, such systems do not insure that the rake arms are symmetrical relative to the center line of the rake.

Figure 21:
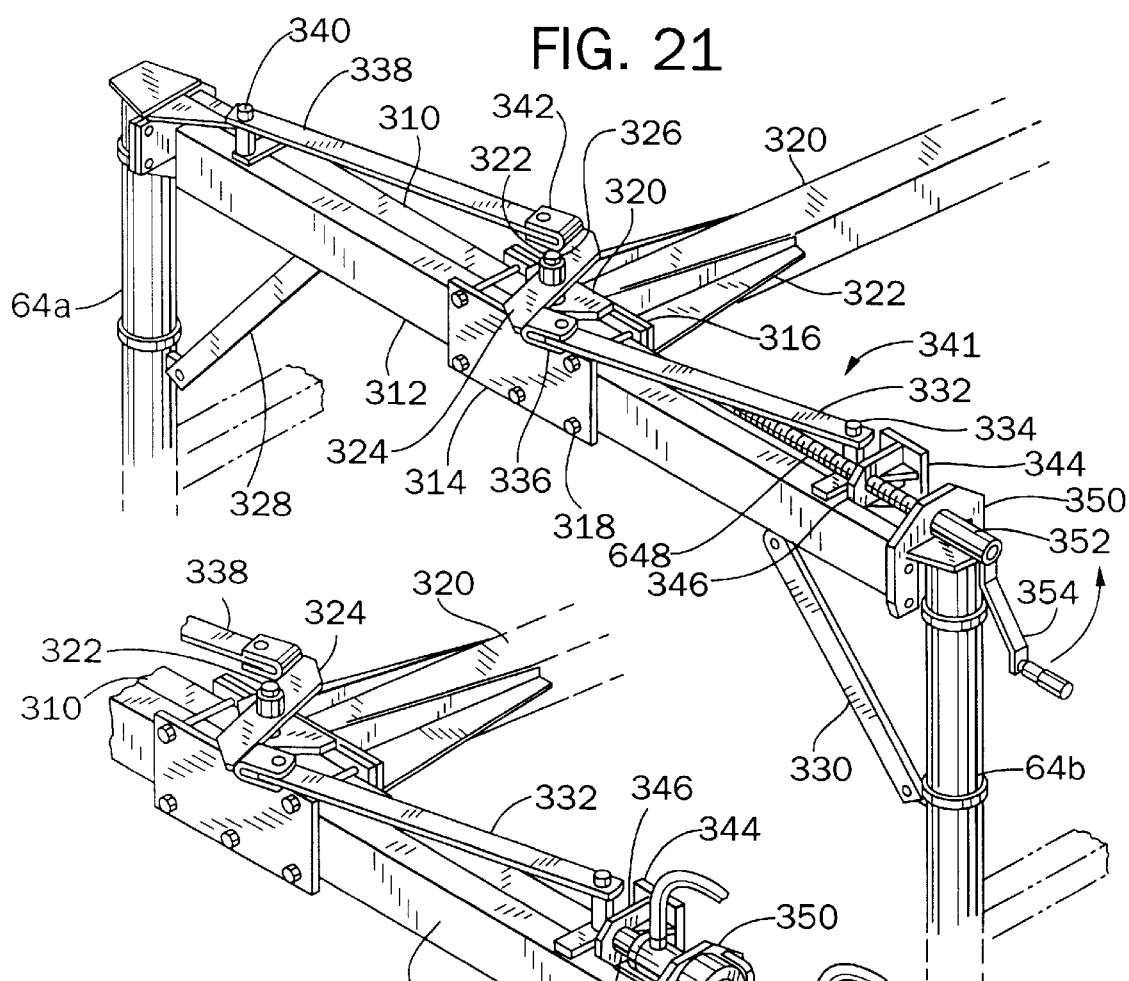
FIG. 21 is a partial isometric view showing an alternative embodiment for a windrow width adjusting arrangement for use with the rake of FIG. 1.

As shown in FIG. 21, transverse member 34' includes a pair of side by side members, in the form of a front cross-member 310 and a rear cross-member 312. Crossmembers 310, 312 are disposed within a space defined between a rear plate 314 and a front plate 316, which are secured together via bolts 318 and which are mounted to the rearward end of the rake drawbar, shown at 320. Reinforcing gussets 322 are connected between drawbar 320 and front plate 316 for reinforcing the connection there between. A top plate 320 extends rearwardly from the upper edge of front plate 316, and a vertical shaft 322 is mounted to and extends upwardly from top plate 320. An arm 324 is pivotably mounted to shaft 322 via a bearing tube 326, such that arm 324 is pivotable about a vertical pivot axis defined by the longitudinal axis of shaft 322.

Referring to FIG. 21, front cross-member 310 is rigidly mounted at its leftward end to the upper end of end member 64a, and a brace 328 reinforces the connection of front cross-member 310 to end member 64a. Similarly, rear cross-member 312 is rigidly mounted at its rightward end to the upper end of end member 64b, and a brace 330 reinforces the connection of rear cross-member 312 to end member 64b.

A link 332 is pivotably mounted at its outer end to a pivot pin 334 extending upwardly from front cross-member 310. The opposite end of link 332 is pivotably connected to one end of aim 324 via a clevis 336. Similarly, the outer end of a link 338 is pivotably mounted to a shaft 340 secured to and extending upwardly from rear cross-member 312, and the inner end of link 338 is pivotably interconnected with the front end of arm 324 via a clevis 342.

An actuator assembly is mounted to front cross-member 310, consisting of an upstanding actuator plate 344 mounted to the front wall of front cross-member 310, and a plate 346 extending rearwardly from the rear surface of plate 344. A threaded passage is formed in plate 346, and a threaded actuator rod 348 is engaged therewithin. The outer end of actuator rod 348 extends through a retainer plate 350 rigidly interconnected between the end of front cross 20 member 310 and the upper end of end member 64b, and is engaged with a hub 352. A handle 354 is mounted to hub 352, and is arranged such that rotation of handle 354 imparts rotation to threaded actuator shaft 348.

FIGS. 22 and 23 illustrate movement of transverse member 34' between extended and retracted positions. FIG. 22 shows transverse member 34' in a fully retracted position, in which front and rear cross-members 310, 312, respectively, are positioned to provide a maximum amount of overlap relative to each other. When it is desired to increase the width of a windrow, handle 354 is turned so as to turn actuator shaft 348 and to move actuator plate 344 away from end member 64b. This results in lateral outward movement of front cross-member 310, which is translated through link 332, arm 324 and link 338 so as to result in lateral outward movement of rear cross-member 312. Handle 354 is turned until a desired width of transverse member 34' is attained, and front and rear cross-members 310, 312, respectively, are maintained in position during operation of the rake. Windrow width is again narrowed by turning handle 354 in the opposite direction to draw actuator plate 344 toward end member 64b, to move the end of front cross-member 310 toward end member 64b. Again, this movement is translated through link 332, arm 324 and link 338 to move rear cross-member 312 inwardly.

With this arrangement, windrow width can be easily manually adjusted simply by turning handle 354. End members 64a, 64b are always maintained at an equal distance relative to the center line of drawbar 320, due to placement of pivot shaft 322 at a location coincident with the center line of drawbar 320.

Figure 24:
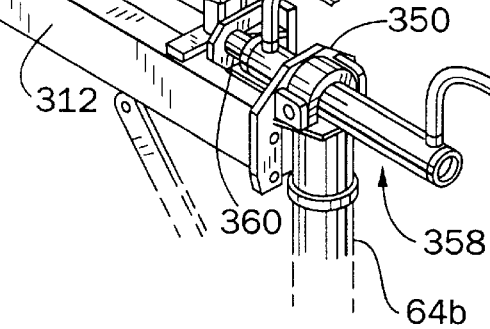
FIG. 24 is a partial isometric view of an alternative embodiment for an actuator for the windrow width adjusting arrangement illustrated in FIG. 21.
Figure 25:
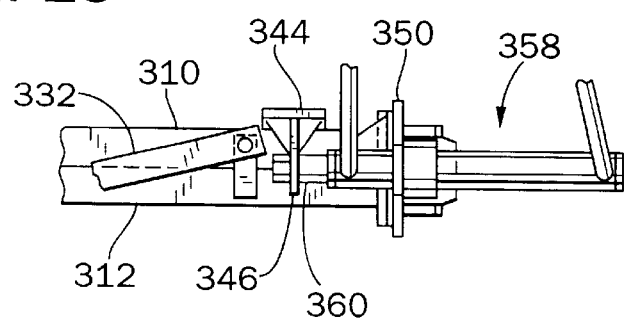
FIG. 25 is a partial top plan view of the actuator of FIG. 24.

FIGS. 24 and 25 illustrate an alternative actuator arrangement for use with transverse member 34'. In this embodiment, a hydraulic cylinder assembly 358 is mounted to plate 350,and the rod of hydraulic cylinder assembly 358, shown at 360, is mounted to rearwardly extending plate 346. Extension of rod 360 results in movement of front cross-member 310 and rear cross-member 312 apart to a position as in FIG. 23, and retraction of rod 360 results in movement of front and rear cross-members 310, 312, respectively, together to a retracted condition as in FIG. 22.

It can thus be appreciated that the present invention involves a number of improvements in a V-rake construction to facilitate ability of the V-rake to maintain engagement with the ground in uneven terrain and to simplify rake construction and operation.

Various alternatives and embodiments are contemplated as being within the scope of the following claims particularly pointing out and distinctly claiming the subject matter regarded as the invention.

I claim:

1. A rake, comprising:
   a wheeled frame assembly adapted for a connection to a tow vehicle;
   a pair of rake arms interconnected with and extending forwardly from the frame assembly, wherein each rake arm has one or more rake members interconnected therewith for raking material inwardly;
   a pair of spaced windrow forming rake members movably mounted to and extending rearwardly from the frame assembly separately from the rake arms;
   an adjustment arrangement interconnected between the frame assembly and each windrow frame rake member, wherein the adjustment arrangement is operable to adjust the spacing between the windrow forming rake members for adjusting the width of a windrow of material formed by the windrow forming rake members as the rake is towed by the tow vehicle ; and
   wherein each windrow forming rake member comprises a rake wheel.

2. The rake of claim 1, wherein the adjustment arrangement is operable to selectively move the rake wheels toward and away from each other for adjusting the width of the windrow.

3. The rake of claim 2, wherein the adjustment arrangement includes an arm interconnected between each rake wheel and the frame assembly, wherein the arm is pivotably interconnected with the frame assembly such that pivoting movement of the arm causes the rake wheel to move toward and away from the other rake wheel.

4. The rake of claim 1, wherein each windrow forming rake member is interconnected with the frame assembly via an arm pivotably interconnected with the frame assembly for movement about a pivot axis transverse to a longitudinal axis defined by the frame assembly, and wherein each adjustment arrangement includes an adjustment member interconnected with one of the arms for controlling the position of the arm, and thereby the windrow forming rake member, relative to the frame assembly.

5. The rake of claim 4, wherein the adjustment member is adjustable in length and extends between the frame assembly and the arm at a location spaced from the pivot axis for controlling the position of the arm.

6. The rake of claim 4, wherein the windrow forming rake member is mounted to a second arm mounted to the first-mentioned arm for movement about a second pivot axis oriented transversely to the first-mentioned pivot axis for moving the windrow forming rake member between an operative lowered position and an inoperative raised position.

7. A rake, comprising:
   a frame adapted for connection to a tow vehicle and including a transverse member;
   a pair of rake arms carried by the transverse member, wherein each rake arm has one or more rake member; interconnected therewith for raking material inwardly; and
   a pair of spaced windrow forming rake members mounted to the transverse member, wherein the windrow forming rake members include an adjustment arrangement for adjusting the spacing therebetween for adjusting the width of a windrow of material formed by the windrow forming rake members as the rake is towed by the tow vehicle, wherein each windrow forming rake member comprises a rake wheel, and wherein the adjustment arrangement is operable to selectively move the rake wheels toward and away from each other for adjusting the width of the windrow;
   wherein the adjustment arrangement includes:
      an arm interconnected between at least one of the rake wheels and the transverse member, wherein the arm is pivotably interconnected with the transverse member such that pivoting movement of the arm causes the rake wheel to move toward and away from the other rake wheel; and
      an adjustable length member interconnected between the arm and the transverse member for controlling the position of the arm, and thereby the rake wheel, relative to the transverse member.

8. The rake of claim 7, wherein the adjustable length member comprises a turnbuckle defining a first end interconnected with the arm and a second end interconnected with the transverse member.

9. The rake of claim 7, wherein the adjustable length member comprises an extendable and retractable cylinder assembly defining a first end interconnected with the arm and a second end interconnected with the transverse member.

10. A rake, comprising;
a frame adapted for a connection to a two vehicle and including a transverse member;
a pair of rake arms carried by and extending forwardly from the transverse member, wherein each rake arm has one or more rake members interconnected therewith for raking material inwardly, and wherein the rake members are movably mounted to the rake arms for movement between an operative lowered position and an inoperative raised position;
a pair of spaced windrow forming rake members interconnected with and extending rearwardly from the transverse member, wherein the windrow forming rake members include an adjustment arrangement for adjusting the spacing therebetween for adjusting the width of a windrow of material formed by the windrow forming rake members as the rake is towed by the tow vehicle, wherein the windrow forming rake members are movable between an operative lowered position and an inoperative raised position; and
a lifting and lowering arrangement associated with each rate arm for moving the one or more rake members interconnected with the rake arm between the operative lowered position and the inoperative raised position, and wherein each lifting and lowering arrangement is interconnected with one of the windrow forming rake members for moving the windrow forming rake members between the operative lowered position and the inoperative raised position along with the one or more rake members.

11. A rake, comprising:
a frame adapted for a connection to a tow vehicle and including a transverse member;
a pair of rake arms carried by the transverse member, wherein each rake arm has one or more rake members interconnected therewith for raking material inwardly;
a pair of spaced windrow forming rake members mounted to the transverse member, wherein the windrow forming rake members include an adjustment arrangement for adjusting the spacing therebetween for adjusting the width of a windrow of material formed by the windrow forming rake member as the rake is towed by the tow vehicle; and
a lifting and lowering arrangement for moving the one or more rake members interconnected with each rake arm between an operative lowered position and an inoperative raised position, and wherein each of the windrow forming rake members is interconnected with the transverse member for movement between an operative lowered position and an inoperative raised position in response to the lifting and lowering arrangement, wherein the lifting and lowering arrangement comprises a rod interconnected with each rake arm and the rake members interconnected therewith, wherein movement of the rod causes movement of the rake members between their inoperative raised position and their operative lowered position, and wherein each windrow forming rake member is interconnected with one of the rods for moving the windrow forming rake member between its operative lowered position and its inoperative raised position.

12. The rake of claim 11, wherein each windrow forming rake member is interconnected with one of the rods via a cable defining a first end interconnected with the rod and a second end interconnected with the windrow forming rake member.

13. The rake of claim 12, wherein the windrow forming rake member is mounted to a pivotable arm with which the second end of the cable is interconnected for causing pivoting movement of the pivotable arm in response to movement of the rod.

14. The rake of claim 12, further comprising a spring interposed between the windrow forming rake member and the cable.

15. The rake of claim 12, further comprising an adjustment member interconnected with the cable for adjusting the vertical position of the windrow forming rake member.

16. A rake, comprising:
a frame adapted for a connection to a tow vehicle and including a transverse member;
a pair of rake arms carried by the transverse member, wherein each rake arm has one or more rake members interconnected therewith for raking material inwardly;
a pair of spaced windrow forming rake members mounted to the transverse member, wherein the windrow forming rake members include an adjustment arrangement for adjusting the spacing therebetween for adjusting the width of a windrow of material formed by the windrow forming rake members as the rake is towed by the two vehicle; and
a lifting and lowering arrangement for moving the one or more rake members interconnected with the rake arms between an operative lowered position and an inoperative raised position, and wherein each of the windrow forming rake members is interconnected with the transverse member for movement between an operative lowered position and an inoperative raised position in response to the lifting and lowering arrangement;
wherein each windrow forming rake member is interconnected with the transverse member by means of a first arm interconnected with the transverse member and a second arm interconnected with the first arm and to which the windrow forming rake member is mounted, wherein the second arm is pivotable relative to the first arm about a transverse pivot axis for providing movement of the windrow forming rake member between its operative lowered position and its inoperative raised position.

17. The rake of claim 16, wherein the first arm is pivotably interconnected with the transverse member for providing transverse movement of the windrow forming rake member.

18. The rake of claim 17, further comprising an adjustable length member interconnected between the first arm and the transverse member for controlling the position of the first arm, and thereby the windrow forming rake member, relative to the transverse member.

19. A method of adjusting the width of a windrow formed by a rake having a frame and a pair of rake arms interconnected with the frame, wherein each rake arm has a series of rake members for raking material inwardly, comprising the steps of pivotably interconnecting a pair of spaced windrow forming rake members with the frame, and adjusting the spacing between the windrow forming rake members by connecting a variable length adjustment member between the frame and each windrow forming rake member at a location spaced from the pivotable interconnection of the windrow forming rake member with the frame, and selectively altering the length of the variable length adjustment member, so as to adjust the spacing between the windrow forming rake members and thereby the width of a windrow formed by material located between the windrow forming rake members.

* * * * *

UNITED STATES PATENT AND TRADEMARK OFFICE
CERTIFICATE OF CORRECTION

PATENT NO.    : 6,314,710 B1
DATED         : November 13, 2001
INVENTOR(S)   : Carletto Tonutti It is certified that error appears in the above-identified patent and that said Letters Patent is hereby corrected as shown below:

Column 14,
Line 35, delete "member," and substitute therefore -- members --;

Column 15,
Line 22, delete "two" and substitute therefore -- tow --;
Line 22, delete "rate" and substitute therefore -- rake --;
Line 42, delete "member" and substitute therefore -- members --;

Column 16,
Line 23, delete "two" and substitute therefore -- tow --;
Line 66, before the "." insert -- wherein each windrow forming rake member comprises a rake wheel --.

Signed and Sealed this

Tenth Day of September, 2002

*Attest:*

*Attesting Officer*

JAMES E. ROGAN
*Director of the United States Patent and Trademark Office*